Figure 1:
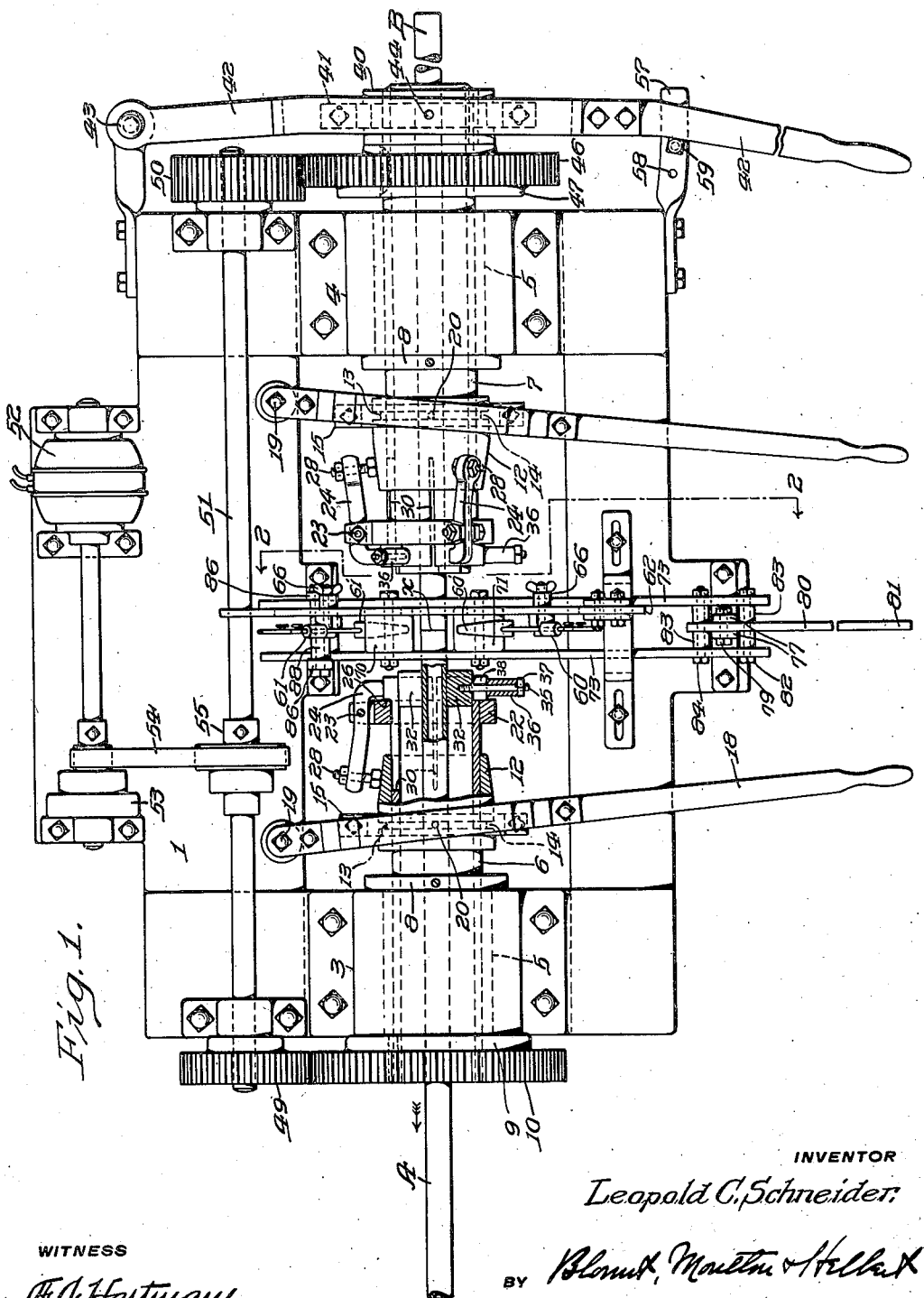

Dec. 19, 1922.

L. C. SCHNEIDER.
PIPE WELDING MACHINE.
FILED MAR. 8, 1921.

1,439,531.

2 SHEETS—SHEET 1.

INVENTOR
Leopold C. Schneider.

WITNESS
F. J. Hartman.

BY
Blount, Moulton & Hillett
ATTORNEYS

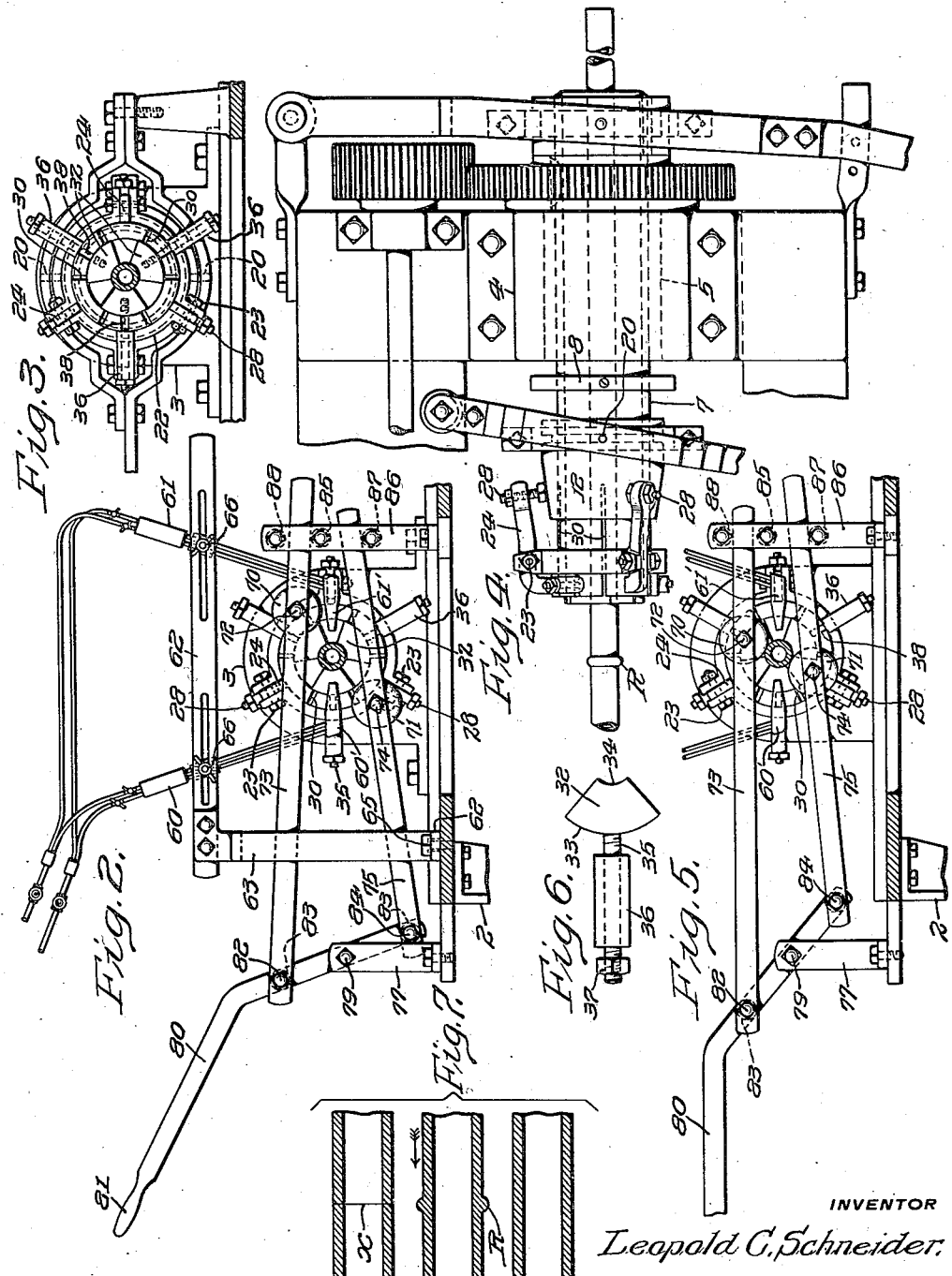

Patented Dec. 19, 1922.

1,439,531

UNITED STATES PATENT OFFICE.

LEOPOLD C. SCHNEIDER, OF GLENSIDE, PENNSYLVANIA.

PIPE-WELDING MACHINE.

Application filed March 8, 1921. Serial No. 450,527.

*To all whom it may concern:*

Be it known that I, LEOPOLD C. SCHNEIDER, a citizen of the United States, and a resident of Glenside, county of Montgomery, and State of Pennsylvania, have invented certain new and useful Improvements in Pipe-Welding Machines, of which the following is a specification, reference being had to the accompanying drawings.

A principal object of my invention is to provide a machine adapted for economically, rapidly and efficiently uniting consecutive sections of pipe end to end by welding the same together in order to form a single unitary pipe of indefinite length, such as is employed in the arts for numerous purposes and more especially in the manufacture of condensers, refrigerating coils, and the like.

Hitherto, in the manufacture of pipes of indefinite length, it has been customary to scarf the adjacent ends of the sections to be united in such manner that one end of each section will slightly enter the adjacent end of the next section and to then unite the sections by heating the metal in the vicinity of the joint and welding the same together by blows directed against the exterior of the pipe, a mandrel being introduced into the pipes and positioned beneath the joint to support the pipe wall under the blows of the welding tool. This method is open to numerous objections, among which may be mentioned the difficulty of inserting a mandrel of sufficient diameter by reason of the inequalities of internal diameter of ordinary commercial pipe and the time which is required to properly complete the weld and bring the exterior of the pipe adjacent the joint to a diameter corresponding with the rest of the pipe.

By the use of my improved machine, however, these difficulties are avoided as the use of the mandrel may, under ordinary conditions, be entirely dispensed with as well as the preliminary scarfing operation, while the welds or joints produced are as strong or stronger than the other portions of the pipe and substantially invisible. Moreover, the use of my machine entirely obviates the necessity of truing up the ends of the pipe prior to the welding operation which has hitherto frequently been a matter involving considerable time and expense as it has been found difficult to produce by the processes and apparatus hitherto in use a satisfactory weld between sections of pipe the ends of which are not true and disposed in a plane at right angles to the axis of the pipes, a condition often present in pipes as purchased in the open market.

My invention further contemplates and includes a process for the production of pipe of indefinite length by consecutively butt-welding sections of pipe together end to end without any preliminary treatment of the ends by bringing the ends of the sections together, heating the metal, moving the sections relatively for a suitable distance toward each other and then reducing the ridge thereby formed on the exterior of the pipe to a diameter corresponding to that of the pipe, the reducing operation further contributing to intimately unite the metal of the two pipes adjacent the point where the weld is formed.

My invention also includes the provision of means in a machine of the character and for the purposes aforesaid, for reducing the ridge which is formed in the welding operation adjacent the point of junction of the pipe sections, said means comprising a plurality of rollers and means for bringing them against the ridge to reduce the same, said means being effective to enable the rollers to perform their required function independently of the diameter of the pipe undergoing treatment and thus automatically adapting the device for use with pipes of different diameters.

My invention further includes all of the other objects and novel features of construction and arrangement hereinafter more definitely specified and described.

In the accompanying drawings I have illustrated a preferred form of machine suitable for the purposes and objects intended, but it will be understood that I do not thereby desire or intend to limit myself to any precise exemplification of means or construction and arrangement thereof, as any means and instrumentalities other than those shown and suitable for performing the desired function may be employed if desired.

Generally speaking, the machine comprises a table on which are supported laterally spaced, axially aligned, oppositely disposed hollow spindles each adapted to grip one of the pipe sections, means for causing the simultaneous rotation of the spindles and sections and means for moving one of the spindles axially toward the other spindle to compress the ends of the pipes together.

The machine also comprises suitable means for heating the metal adjacent the welding point and means for reducing the ridge formed thereat during the welding operation. The machine is preferably so constructed that the pipe sections may be fed in consecutively at one side and ejected at the other side, after the welding operation, in the form of a continuous pipe, the length of which is only determined by the limits of the space into which the pipe may be projected beyond that side of the machine.

In the said drawings, in which like numerals are used to designate corresponding parts in the several figures, Fig. 1 is a top plan view of the machine with two sections of pipe clamped therein in the position to which they are initially brought prior to the commencement of the actual welding operation; Fig. 2 is a transverse vertical fragmentary section of the machine shown in Fig. 1 taken on the line 2—2 looking in the direction of the arrows; Fig. 3 is an end elevation of one of the gripping chucks; Fig. 4 is a fragmentary top plan view of a portion of the machine shown in Fig. 1 but showing the parts in the position assumed after the relative movement of the pipe sections has been accomplished in the welding operation; Fig. 5 is a view substantially similar to Fig. 2, but with some of the parts shown in that figure omitted, illustrating the manner of reducing the ridge formed on the exterior of the pipe after the relative movement of the pipes referred to; Fig. 6 is a view in elevation of one of the segmental spacers removed from the gripping chuck and Fig. 7 is a composite view showing portions of the pipe sections in the vicinity of the joint as they appear at the initiation of the welding operation, during said operation, and at the completion thereof.

Referring now more particularly to the drawings, the form of machine shown therein comprises a base or table 1 supported on suitable legs 2, one of which is fragmentarily shown. Adjacent opposite ends of the base are positioned spindle carrying heads 3 and 4 each having a bushing 5 in which the hollow spindles 6 and 7 are respectively mounted, it being understood that the hereinafter described arrangement of both of the spindles and of their adjacent parts is substantially similar save in certain particulars to which reference is especially made. The spindles are prevented from longitudinal movement outwardly by the collars 8 which abut against the inner ends of the heads, and the spindle 6 is prevented from movement inwardly by the engagement of a flange 9, integral with a gear 10 keyed to the outer end of and carried by the spindle adjacent the outer face of the head 3. Upon that portion of each spindle projecting inwardly from the adjacent head is mounted a sliding sleeve 12 having a portion of its surface beveled outwardly, and suitable means are provided for moving the sleeves longitudinally of the spindles without interfering with their rotation therewith. Conveniently said means comprise a peripheral groove 13 in the sleeve in which engages a tongue 14 on a strap 15 clamped loosely around the sleeve and movable through the operation of a horizontally positioned lever 18 vertically pivoted to the base of the machine in the rear of the spindle as at 19 and having its free end adjacent the front of the machine for convenient manipulation by the operator. Preferably the lever may be formed to provide a vertically positioned yoke which surrounds and accommodates the strap 15, a pair of diametrically opposed pins 20 extending through the yoke and into the strap serving to communicate the motion of the former to the latter. However, any suitable means other than those described for effecting longitudinal movement of the sleeve on the spindle may be utilized if desired.

Between the inner end of each sleeve 12 and the inner end of each spindle and loosely positioned on the latter is a collar 22 conveniently formed from a plurality of segments having radially outwardly directed lugs, bolts 23 serving to connect the lugs together. Mounted on each of these bolts, which may conveniently be three in number, is a movable substantially L-shaped dog 24, the inner end of which is operative to bear against the surface of the spindle adjacent its inner end, which at this point may preferably be slightly enlarged in diameter to provide a shoulder 26 against which the collar can abut. Through the outer end of each dog an adjusting screw 28 is arranged to extend, one end of which is operative to bear against the beveled surface of the sliding sleeve 12 in such manner that when the latter is moved inwardly along the spindle the dogs will be freed against the surface thereof, and as the spindle is provided with a plurality of circumferentially spaced slots 30 extending longitudinally in its walls the movement of the sleeve is thus effective through the dogs to slightly contract the end of the spindle for the purpose of gripping a pipe positioned therein.

Obviously as the amount which the spindle may be thus contracted is relatively small, a spindle of given internal diameter would only be effective to operatively grip but a single size of pipe. Means are therefore provided for adapting the machine for use with different sizes of pipe, said means preferably comprising a plurality of interchangeable segmental jaws 32, one of which is shown in Fig. 6, each having its outer surface 33 formed on a radius of curvature similar to that of the interior of the spindle and its inner surface 34 on a radius similar to that of the exterior of the particular size of pipe it is intended to grip. Fixed in the jaw and extending radially outward therefrom is a bolt 35 on which is loosely positioned a sleeve 36, the outer end of the bolt being threaded and carrying an adjusting nut 37. The end of each spindle is provided with a plurality of short, equidistantly spaced slots 38 extending longitudinally of the spindle and of suitable width to receive the bolts 35 so that by loosening the nut 37 the bolt may be slipped into one of these slots with the sleeve 36 on the outside of the spindle, and the jaw then drawn tightly against the interior of the spindle by setting up on the nut, three jaws being ordinarily employed in each spindle. Thus, by utilizing sets of jaws of different thickness the machine may be adapted for use with different sizes of pipe within the limits determined by the interior diameter of the spindles.

In order to effect relative longitudinal movement of the pipe sections during the welding operation without interfering with their rotation, suitable means are provided preferably comprising a grooved collar 40 operatively fixed on the outer end of one of the spindles, conveniently the spindle 7, and cooperative with a strap 41 which surrounds the collar and has a tongue extending in the groove therein. A horizontally movable lever 42 is pivoted at some convenient point 43 in the rear of the spindle and is connected to move the strap in any convenient way, as, for example, by providing the lever with a yoke surrounding the strap and carrying two diametrically opposed, inwardly directed pins 44 which extend through the yoke and into the strap in a manner somewhat similar to that already described in connection with the means for moving the sliding sleeves 12. Keyed or otherwise secured on the spindle between the inner face of the collar and the outer face of the head 4 is a gear 46 having an integral flange 47 on its inner side which is adapted, by contact with the outer face of the head, to limit the inward movement of the spindle when the lever 42 is moved to the left, the movement of the spindle in the other direction being limited by engagement of the flange 8 with the inner face of the head, the distance between the opposed faces of the flanges 8 and 47 being somewhat greater than the width of the head to afford a suitable range of longitudinal movement to the spindle.

For rotating the spindles simultaneously and at the same speed, gears 49 and 50 carried at the ends of a shaft 51 extending longitudinally of the machine in the rear of the spindles are arranged to respectively mesh with the gears 10 and 46, power being supplied to the shaft from any suitable source, such as an electric motor 52 driving a stepped cone pulley 53 connected by a belt 54 with similar complementary pulley 55 mounted on the shaft 51 or in any other suitable manner, but preferably in such way that the speed of the shaft 51 may be conveniently changed when using the machine with different sizes of pipe, as hereinafter more fully explained. The face of gear 50 is preferably made somewhat wider than that of gear 46 so that in all possible positions of the spindle full engagement of the gears is insured, and for adjustably limiting the movement of lever 42 the latter may be arranged to extend over a bracket 57 fastened to the table of the machine and having holes 58 in which a stop 59 may be positioned as required.

It will be understood that in the operation of the machine a section of pipe is initially gripped in each spindle with the ends of the sections A and B abutting as at X in Fig. 1. Conveniently, this is accomplished by pushing the section A entirely through the spindle 7 in the direction of the arrow in Fig. 1, the sleeves 12 of course being retracted, and then gripping the pipe in the spindle 6 with its rear end lying midway between the spindles. The section B is then pushed through the spindle 7 till its forward end contacts with the section A and then gripped therein, the spindle during this operation being withdrawn toward the right as shown in Fig. 1 and held in that position through the engagement of stop 59 with lever 42.

For heating the pipe sections in the vicinity of the point X heating means, preferably comprising a pair of suitable oxy-acetylene torches 60 and 61, are provided, and adjustably supported on a transversely extending slotted bar 62 carried on standards 63 preferably having slotted feet 64 resting on the surface of the table and secured thereto by bolts 65 which extend through the slots in such manner as to permit the standards to be moved longitudinally of the table to effect corresponding movement of the torches and enable the burners 60', 61' to be properly adjusted longitudinally of the pipe section. The torches are preferably connected to the bar 62 by adjustable clamps 66, by means of which the burners may be respectively adjusted transversely of the pipe sections so that the flames issuing from the burners may be properly directed during the welding operation. The particular form and construction of the torches form no part of the present invention.

During the welding operation, as hereinafter more fully described, an outwardly directed ridge R is formed on the pipe adjacent the point X, and for the purpose of reducing this ridge to the general diameter of the pipe in order that the latter after the welding operation may present a smooth and uniform exterior, suitable means comprising rolls and mechanism for bringing them into contact with and forcing them against the ridge at substantially diametrically opposed points, are provided, said means, in the form of the invention shown, comprising an upper roll 70 and a lower roll 71, the former being positioned somewhat above and in the rear of the pipe and the latter somewhat below and in front thereof. The roller 70 is supported on a horizontal axle 72, extending parallel to the pipe and between a pair of bars 73 positioned transversely of the machine, and the roller 71 is similarly positioned on an axle 74 carried by a substantially similar pair of bars 75. Adjacent the front edge of the table a pair of vertically extending supports 77 are secured and between them, on a bolt 79, is rotatably mounted a lever 80 terminating in a handle 81 positioned for convenient manipulation by the operator. The forward end of the bars 73 are connected with this lever above the bolt 79 by a transversely extending pivot bolt 82, a spacer sleeve 83 being interposed between each bar and the adjacent side of the lever and the forward ends of the bar 75 are similarly connected with the lever by a pivot bolt 84 positioned below the bolt 79, the length of the respective bars 73 and 75 being such that under normal conditions the point of attachment of the bars 73 to the lever will lie in front of a vertical plane passing through the bolt 79 and the point of attachment of the bars 75 thereto will lie in the rear of said plane. The rear ends of the bars 73 normally rest upon a transversely extending horizontally positioned roller 85 supported between a pair of vertical standards 86 secured to the table, and the bars 75 are similarly supported upon a similar roller 87 positioned below the roller 85. Located between the standards above the upper surface of the bars 73 and out of contact therewith when the bars are resting on the roller 85 is another transversely extending roller 88, which, however, under certain conditions of operation, is effective to limit the upward movement of the bars and afford a fulcrum therefor.

In the operation of the machine the pipe sections are first introduced therein and gripped in the spindles or chucks in the manner hitherto described with the ends of the sections abutting as at X at a point substantially equidistant from the inner faces of the spindles, the several parts being thus in substantially the position shown in Fig. 1 with the lever 80 raised so as to move the rolls 70 and 71 away from the pipe as shown in Fig. 2, with the rear ends of the bars 73 and 75 respectively supported on the rollers 85 and 87. Power is now supplied to the machine to rotate the shaft 51 and in turn the spindles in the direction indicated by the arrow in Fig. 2. The torches are next lighted and the burners adjusted so as to heat the pipe sections in the vicinity of the point X until the metal is brought to proper welding heat when, with the parts continuing to revolve, the spindle 7 carrying the pipe section B is moved longitudinally by means of lever 42 in the direction of pipe section A, thus crowding the ends of the sections forcibly together.

When the sections are forced together in the manner aforesaid, the metal from the inside thereof appears to crowd radially outward so as to produce a small outwardly directed ridge R, to which reference has already been made, on the exterior of the pipe as best shown in Fig. 7, no corresponding ridge, or under certain conditions a ridge of very much smaller size, being formed on the interior of the pipe. The formation of the exterior ridge is probably due to the fact that as, during the heating operation, the metal near the outer surface of the pipe is exposed more directly to the action of the heat than that more nearly adjacent the interior, it is raised to a relatively higher temperature and is therefore relatively more plastic, and additionally, as under operative conditions frequently a portion of the outside metal is completely fused and burned away, thus leaving a body of very fluid metal, or even an actual depression, adjacent the welding point so that the tendency of the relatively less plastic metal from the center of the pipe is to flow outwardly instead of inwardly when the sections are longitudinally squeezed together.

The heat is now preferably reduced or entirely cut off and the lever 80 depressed, which moves the roll 70 forwardly and downwardly and the roll 71 rearwardly and upwardly toward the pipe to contact with ridge R. As the downward pressure on the lever is continued, the bars 73 are raised from the roller 85 and contact with the roller 88 which thus forms a fulcrum therefor, while the bars 75 continue to fulcrum on the roller 87. Both sets of bars thereby simultaneously operate as levers of the second class to force the rolls, which revolve through frictional engagement with the pipe, in substantially diametrically opposite directions against the ridge which is thus reduced or "ironed out" while still plastic, and the pipe in the vicinity of the welding point brought to proper diameter. It will of course be understood that the movement of the rolls toward the axis of the pipe is limited by contact of the ends of the rolls with the relatively cold portions of the pipe on each side of the welding point so that the operator is automatically prevented from forcing the rolls to a point which would cause a constriction in the pipe. Additionally, the action of the rolls on the plastic or semi-plastic metal in the vicinity of the welding point appears to be effective to intimately co-mingle and unite the molecules of the metal of the two sections and produce a good weld therebetween so that, as has been found by actual test, the finished pipe is stronger in the vicinity of the welds than at any other portion of its length.

It will be noted that the rolls and roll actuating means are substantially self adjusting to any size of pipe, as by raising the lever 80 the rolls can be moved away from the axis of the spindles for a distance sufficient to permit the introduction of the largest size pipe which can be welded in the machine and that by movement of the lever in the opposite direction the rolls may be brought against the surface of such pipe or pipe of any smaller diameter, in such manner as to always bear against the same at substantially diametrically opposed points.

It will of course be understood that the welded pipe projected from the machine is supported on suitable rolls or the like, not shown in the drawings, and it is found in practice that it is desirable to provide a trough or grooved table in such position between the machine and such rolls as to initially support the pipe on a continuous surface instead of at spaced points until the metal in the vicinity of the welds has had an opportunity to thoroughly harden, as in the absence of such supporting trough, the rotation of the pipe during the process of making a subsequent weld has a tendency to deflect or bend the pipe while it is still soft and thus destroy its alignment. Preferably, the support utilized beneath the projecting end of the section B is made vertically adjustable in any suitable manner to better adapt it for supporting different sizes of pipe in axial alignment with the spindles.

It is found in practice that the speed of rotation of the spindles should be varied inversely as the diameter of the pipe being welded in order to maintain a substantially constant peripheral surface speed for the pipe, as if the machine is driven when welding large pipes at the same speed as when welding small ones, the surface speed of the former will ordinarily be too great to obtain the best results if the surface speed of the latter was proper and vice versa. In the form of the invention shown this change may be readily effected to correspond with different diameters of pipe by shifting the belt 54 on the cone pulleys, or if other speed changing means than those illustrated are employed, then by suitable operation of such means.

While I have herein described with considerable particularity the various steps of my process of welding pipe sections and have illustrated in considerable detail a machine adapted for the performance thereof, I do not thereby desire or intend to specifically limit myself to the precise details of construction and arrangement of the various elements entering into the machine nor to any particular manner or direction of feeding the pipe sections thereto or of effecting their relative movement therein during the process of making the weld, as the same may be varied and modified as desired or as required to meet conditions encountered in practice without departing from the spirit and scope of the invention as defined by the appended claims.

Having thus described my invention, I claim and desire to protect by Letters Patent of the United States:

1. In a machine for welding pipe the combination of a pair of oppositely disposed hollow spindles each adapted to grip a section of pipe, means for rotating said spindles simultaneously, means for heating the pipe sections between the points where they are gripped by the spindles, and means for imparting relative longitudinal movement to the sections while gripped by and rotating with the spindles.

2. In a machine for welding pipe the combination of a pair of oppositely disposed hollow spindles each adapted to grip a pipe section, means for heating the pipe sections between the spindles, means for simultaneously rotating the spindles at the same speed, and means for imparting to one of said spindles a longitudinal movement with respect to the other spindle while both of said spindles are rotating.

3. In a machine for welding pipe the combination of a pair of oppositely disposed hollow spindles, separate means for causing each spindle to operatively grip and hold a pipe section, means for heating said pipe sections between the points where they are gripped by the spindles, means for simultaneously rotating the spindles at the same speed, and means for imparting to one of said spindles a longitudinal movement with respect to the other spindle while both of said spindles are rotating.

4. In a machine for welding pipe a hollow spindle having a plurality of longitudinally extending spaced slots in its walls and means within the spindle comprising a plurality of removable and interchangeable spaced segmental jaws adapted to contact with the exterior of a pipe and means adapted to engage in said slots to retain said jaws in operative position within the spindle.

5. In a machine for welding pipe a hollow spindle having longitudinally extending slots, a plurality of removable and interchangeable segmental jaws adapted to contact with the exterior of a pipe and disposed within the spindle, means adapted to enter said slots for operatively maintaining said jaws within said spindle, and means for causing radial contraction of the spindle to force said jaws against the exterior of a pipe positioned within the spindle.

6. In a machine for welding pipe sections end to end the combination with means for holding the sections to be welded, means for rotating the sections and means for imparting relative longitudinal movement to the sections while rotating, of a pair of rolls and means for forcing said rolls against said sections at substantially diametrically opposed points.

7. In a machine for welding pipe sections end to end the combination with means for holding the sections to be welded, means for rotating the sections simultaneously, means for heating the sections adjacent the welding point and means for imparting relative longitudinal movement to the sections while rotating, of a pair of rolls and means for forcing the rolls against the sections at substantially diametrically opposed points irrespective of the diameter of the sections.

8. In a machine for welding pipe sections end to end the combination of means for holding the sections to be welded, means for rotating the sections and means for imparting relative longitudinal movement to the sections while rotating, of a pair of rolls rotatable on axes parallel to the axis of the sections and means extending transversely to the axis of the sections for bringing said rolls into contact with the sections at substantially diametrically opposed points.

9. In a machine for welding pipe sections end to end the combination of means for holding the sections to be welded, means for rotating the sections and means for imparting relative longitudinal movement to the sections while rotating, of a pair of rolls rotatable on axes parallel to the axis of the sections supported on vertically spaced movable bars, a support for one end of the lower bar adapted to form a fulcrum therefor when said bar is moved upwardly toward the pipe sections, means for supporting an end of the upper bar, and means normally spaced from said bar adapted to contact therewith when the said bar is moved downwardly toward the pipe sections to form a fulcrum for the bar.

10. In a machine for welding pipe sections end to end the combination of means for holding the sections to be welded, means for rotating the sections and means for imparting relative longitudinal movement to the sections while rotating, of a pair of rolls and vertically spaced, vertically and transversely movable bars forming supports for said rolls and manually operable means for simultaneously moving the upper bar downwardly toward the pipe sections and the lower bar upwardly toward the pipe sections to bring said rolls into contact with said sections at substantially diametrically opposed points.

11. In a pipe welding machine adapted for welding pipe sections end to end a pair of rolls, means for supporting said rolls above and below the pipe sections to be welded, said means comprising upper and lower transversely extending bars, a horizontally pivoted, manually operable lever connecting the adjacent ends of the bars, a support for the opposite end of the lower bar, a support for the corresponding end of the upper bar normally adapted to sustain the weight of said bar, and a roller normally spaced from and positioned above said upper bar adapted to form a fulcrum for said bar when said lever is depressed to bring said rollers into contact with said pipe sections.

12. The process of welding two pipe sections end to end which consists in bringing the ends of the sections together, heating the abutting ends of the sections to a welding heat while revolving both sections at the same speed, moving the sections together in a longitudinal direction whereby a ridge is formed adjacent the welding point and reducing the ridge by pressure exerted at substantially diametrically opposed points while the pipe is rotating and the metal in the vicinity of the ridge in unsupported and plastic or semi-plastic condition.

13. The process of welding two pipe sections end to end which consists in bringing the ends of the sections together, directing a heating medium against the exterior of the sections to bring the abutting ends thereof to a welding heat while revolving both sections at the same speed, moving the sections together in a longitudinal direction whereby a ridge is formed adjacent the welding point and reducing the ridge by bringing external pressure to bear upon the ridge at substantially diametrically opposed points and while the pipe is rotating and the metal in the vicinity of the ridge plastic or semi-plastic.

14. The process of welding two pipe sections end to end without preliminary treatment of the ends as by scarfing or facing which consists in bringing the ends of the sections to abutting contact, heating the ends to a welding heat by heat directed against the exterior of the sections while revolving both sections at the same speed, moving the sections relatively toward each other in a longitudinal direction whereby a ridge is formed adjacent the welding point, and reducing the ridge by pressure exerted radially of the pipe at substantially diametrically opposed points while the pipe is rotating and the metal in the vicinity of the ridge unsupported and in a plastic or semi-plastic condition.

15. The process of welding two pipe sections end to end which consists in bringing the ends of the sections to abutting contact, rotating the sections simultaneously at the same speed, bringing the ends of the sections to a welding heat, moving the sections toward each other in a longitudinal direction and exerting pressure in a radially inward direction on the plastic or semi-plastic metal at substantially diametrically opposed points in opposite directions and in the absence of internal support for the pipe wall to reduce the exterior of the pipe adjacent the weld to a diameter corresponding to the general diameter of the sections.

In witness whereof, I have hereunto set my hand this third day of March, A. D. 1921.

LEOPOLD C. SCHNEIDER.